US007806978B2

(12) United States Patent
Pruett et al.

(10) Patent No.: US 7,806,978 B2
(45) Date of Patent: Oct. 5, 2010

(54) FINE PLATY KAOLIN COMPOSITION

(75) Inventors: Robert J. Pruett, Milledgeville, GA (US); Jun Yuan, Kathleen, GA (US); Bomi M. Bilimoria, Macon, GA (US); Roger W. Wygant, Sandersville, GA (US); Anthony V. Lyons, Macon, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 10/531,257

(22) PCT Filed: Dec. 15, 2003

(86) PCT No.: PCT/US03/39883

§ 371 (c)(1),
(2), (4) Date: Nov. 18, 2005

(87) PCT Pub. No.: WO2004/061014

PCT Pub. Date: Jul. 22, 2004

(65) Prior Publication Data

US 2006/0124033 A1    Jun. 15, 2006

(51) Int. Cl.
*C04B 14/04* (2006.01)
*C01F 5/24* (2006.01)

(52) U.S. Cl. .......... 106/484; 106/486; 106/487; 106/488; 106/485; 423/432

(58) Field of Classification Search .......... 106/486, 106/484, 485, 487, 488; 423/432
See application file for complete search history.

(56) References Cited

U.S. PATENT DOCUMENTS

| | | | |
|---|---|---|---|
| 3,450,257 A | 6/1969 | Cundy | |
| 4,227,920 A | 10/1980 | Chapman et al. | |
| 4,888,315 A * | 12/1989 | Bowman et al. | 501/144 |
| 5,036,599 A * | 8/1991 | Thompson | 34/290 |
| 5,085,707 A * | 2/1992 | Bundy et al. | 106/486 |
| 5,128,606 A | 7/1992 | Gate et al. | |
| 5,168,083 A | 12/1992 | Matthews et al. | |
| 5,223,088 A * | 6/1993 | Hansen | 159/2.1 |
| 5,411,587 A * | 5/1995 | Willis et al. | 106/486 |
| 5,522,924 A * | 6/1996 | Smith et al. | 106/488 |
| 5,685,900 A | 11/1997 | Yuan et al. | |
| 6,149,723 A * | 11/2000 | Pruett et al. | 106/486 |
| 6,402,826 B1 * | 6/2002 | Yuan et al. | 106/486 |
| 6,468,343 B1 | 10/2002 | Pruett et al. | |
| 6,475,274 B1 | 11/2002 | Lowe et al. | |
| 6,537,363 B1 * | 3/2003 | Golley et al. | 106/486 |
| 6,610,137 B2 * | 8/2003 | Golley et al. | 106/486 |
| 6,616,749 B1 * | 9/2003 | Husband et al. | 106/486 |
| 6,652,642 B2 * | 11/2003 | Sare et al. | 106/486 |
| 6,660,076 B2 * | 12/2003 | Valadares et al. | 106/486 |
| 6,814,796 B2 * | 11/2004 | Husband et al. | 106/486 |

FOREIGN PATENT DOCUMENTS

| | | |
|---|---|---|
| CA | 2 373 914 | 8/2002 |
| WO | WO 99 51815 | 10/1999 |
| WO | WO 99/51815 | * 10/1999 |
| WO | WO 99/58613 | 11/1999 |
| WO | WO 00/59840 | * 10/2000 |

OTHER PUBLICATIONS

Jepson, W. B., "Kaolin: Their Properties and Uses", Phil. Trans. R. Soc. Lond, A311, pp. 411-432, 1984.
Grant, R. et al. "Coated-Paper Producers Look Forward to Brighter Times" Pulp and Paper International, vol. 36, No. 5, p. 18, May 1984.
Typical Physical Properties Data Sheet for ALPHACOTE® dated Mar. 4, 1998.

* cited by examiner

*Primary Examiner*—Jerry Lorengo
*Assistant Examiner*—Shuangyi Abu Ali
(74) *Attorney, Agent, or Firm*—Finnegan, Henderson, Farabow, Garrett & Dunner, L.L.P.

(57) ABSTRACT

The present invention relates to a kaolin composition having improved physical properties, for example, for use in the production of paper products. The composition can comprise kaolin having a shape factor of at least about 20. The kaolin can have a particle size distribution such that at least about 94% by weight of the kaolin can have an esd of less than about 2 μm and/or at least about 80% by weight of the kaolin can have an esd of less than 1 μm. The amount of the kaolin having an esd of less than about 0.25 μm can range from about 25% to about 60% by weight. The Hercules viscosity of the kaolin product is less than 4000 rpm at 18 dynes at 63% solids and less than 1500 rpm at 18 dynes at 69% solids when measured using the "A" bob. The present invention also relates to an improved method for making the kaolin product from sedimentary kaolin.

30 Claims, No Drawings

FINE PLATY KAOLIN COMPOSITION

The present invention relates to novel kaolin compositions, methods for making such compositions, and their uses.

Paper coating compositions are generally prepared by forming a fluid aqueous suspension of pigment material together with a hydrophilic adhesive and other optional ingredients. The coating may conveniently be applied with roll applicators with trailing blades, or by a coating machine including a short dwell time coating head, which is a device in which a captive pond of coating composition under a slightly elevated pressure is held in contact with a moving paper web before excess coating composition is removed by means of a trailing blade. However, other types of coating apparatus may also be used for preparing a variety of paper types.

An important white inorganic pigment for use in preparing coating compositions for paper is kaolin obtained from kaolin clay. Large deposits of kaolin clay exist in Devon and Cornwall, England and in the States of Georgia and South Carolina, United States of America. Kaolin clay consists predominantly of the mineral kaolinite, together with small proportions of various impurities.

Kaolinite exists in the form of hydrous aluminosilicate crystals in the shape of thin hexagonal plates, but these plates tend to adhere together face-to-face to form stacks or booklets. The individual plates may have mean diameters of 1 μm or less, but kaolinite particles in the form of booklets or stacks of plates may have an equivalent spherical diameter (esd) of up to 10 μm or more.

Generally speaking, kaolin clay particles that have an equivalent spherical diameter of 2 μm or more are in the form of stacks of kaolinite plates, rather than individual plates. Additionally, in some sedimentary kaolin deposits, smaller kaolin particles may sometimes adhere together in random orientations to form agglomerated particles having equivalent spherical diameters significantly greater than 2 μm.

Kaolinite stacks may be subjected to a grinding action to separate or delaminate the stacks or books comprised of more than one platelet into smaller books or individual platelets. The act of delamination parts, or cleaves, natural kaolinite crystals along the (001) crystallographic plane that is perpendicular to its "c-axis." Often, the stacks or books are found in crude kaolin or coarse reject from a centrifugal size separation. It is traditionally believed that sand grinding would delaminate coarse kaolin stacks into more platy individual platelets. These standard delaminated products, however, may not show sufficient delamination, as they can contain booklets that comprise several to scores of kaolinite platelets.

The kaolin deposits in England differ from those in the United States of America and Brazil in that the English deposits are of primary kaolin, while those in the USA and Brazil are of the sedimentary type. Kaolin was formed in geological times by the hydrothermal decomposition of the feldspar component of granite and primary kaolin is that which is obtained directly from the granite matrix in which it was originally formed.

On the other hand, sedimentary kaolin, also known as secondary kaolin, has been washed out of the original granite matrix in geological times and has been deposited in an area remote from the site in which it was originally formed. Sedimentary kaolin deposits tend to have a higher proportion of fine particles, i.e., those having an esd smaller than about 2 μm, because the kaolin has undergone a certain amount of natural grinding during the course of its transport from its site of origin to its site of final deposition. See, for example, Jepson (Jepson, W. B., "Kaolins: their properties and uses", Phil. Trans; R. Soc. Lond., A311, 1984, pp 411-432). Sedimentary kaolins also tend to be more blocky than primary kaolins, including large numbers of both kaolin stacks and agglomerates of smaller blocky kaolin particles.

There remains a need for delaminated kaolin compositions, and more facile processes for making such compositions.

One aspect of the present invention provides a composition comprising kaolin having a shape factor of at least about 20, wherein at least about 80% by weight of the kaolin has an esd of less than 1 μm, and the amount of the kaolin having an esd of less than about 0.25 μm ranges from about 25% to about 60% by weight.

Another aspect of the present invention provides a method of refining kaolin, comprising:
(a) providing a degritted kaolin slurry comprising a sedimentary kaolin having a particle size distribution such that at least 70% by weight of the kaolin has an esd of less than about 2 μm; and
(b) classifying said kaolin slurry to obtain a kaolin having a shape factor of at least about 20, wherein at least about 94% by weight of the kaolin has an esd of less than about 2 μm.

Another aspect of the present invention provides a method of refining kaolin, comprising:
providing a degritted kaolin slurry comprising a sedimentary kaolin having a shape factor of at least about 10, wherein at least about 80% by weight of the kaolin has an esd of less than about 2 μm;
wet media grinding the degritted kaolin slurry consuming in the range of from about 10 to about 200 kW-hr/ton of energy; and
classifying the slurry to a fine fraction wherein at least about 80% by weight of the kaolin has an esd of less than about 1 μm.

Another aspect of the present invention provides a method of refining kaolin, comprising:
(a) providing a kaolin slurry, the kaolin having a shape factor of at least about 20, wherein at least about 70% by weight of the kaolin has an esd of less than about 2 μm; and
(b) classifying the slurry to a fine fraction wherein at least about 96% to about 98% by weight of the kaolin has an esd of less than about 2 μm.

Another aspect of the present invention provides a coated paper, comprising a fibrous substrate, and a coating on the substrate comprising kaolin having a shape factor of at least about 20, wherein at least about 80% by weight of the kaolin has an esd of less than about 1 μm, and the amount of the kaolin having an esd of less than about 0.25 μm ranges from about 25% to about 60% by weight.

Another aspect of the present invention provides a method of making a coated paper, comprising coating a fibrous substrate with a paper coating composition comprising kaolin having a shape factor of at least about 20, wherein at least about 80% by weight of the kaolin has an esd of less than about 1 μm, and the amount of the kaolin having an esd of less than about 0.25 μm ranges from about 25% to about 60% by weight.

Another aspect of the present invention provides a method of making a kaolin slurry, comprising dewatering kaolin with an evaporator. In one aspect, the kaolin has a shape factor of at least about 50, and at least about 85% by weight of the kaolin has an esd of less than about 2 μm. In another aspect, the kaolin has a shape factor of at least about 25, and at least about 85% by weight of the kaolin has an esd of less than about 2 μm.

The present invention provides a kaolin having a novel particle size distribution and shape factor, and methods for making such kaolins. When used as a pigment in paper coating applications, the inventive kaolin can provide the desired gloss and brightness, among other properties.

One aspect of the present invention is a composition comprising kaolin having a particle size distribution ("psd"), wherein at least about 94% by weight of the kaolin has an esd of less than about 2 μm and at least 80% by weight of the kaolin has an esd of less than 1 μm. In another aspect, the amount of kaolin having an esd of less than about 0.25 μm ranges from about 25% to about 60% by weight. In yet another aspect, the kaolin has a shape factor of at least about 20.

As will be appreciated by those skilled in the art, the psd of a particulate product such as the pigment product according to the present invention may be determined by measuring the sedimentation speeds of the dispersed particles of the particulate product under test through a standard dilute aqueous suspension using a SEDIGRAPH™ instrument, e.g., SEDIGRAPH 5100, obtained from Micromeritcs Corporation, USA. The size of a given particle is expressed in terms of the diameter of a sphere of equivalent diameter, which sediments through the suspension, i.e., an equivalent spherical diameter or esd, the parameter as referred to above. The SEDIGRAPH records the percentage by weight of particles having an esd less than a particular esd value, versus that esd value.

In one aspect, the kaolin can have a particle size distribution, wherein at least about 94% by weight of the particles, such as amounts of at least about 95% by weight, at least about 96% by weight, at least 98% by weight, or amounts ranging from about 94% to about 99% by weight, have ah esd of less than about 2 μm.

In another aspect, the kaolin can have a particle size distribution, wherein at least about 80% by weight of the particles, such as amounts of at least about 85% by weight, at least about 88% by weight, at least 92% by weight have an esd of less than about 1 μm.

According to another aspect of the present invention, the range of from about 35% to about 50% by weight of the kaolin has an esd less than about 0.25 μm.

In another aspect of the present invention, the kaolin can have a Hercules viscosity of less than about 4000 rpm at 18 dynes at 63% solids, less than about 2750 rpm at 18 dynes at 66% solids, or less than 1500 rpm at 18 dynes at 69% solids, all measured using the "A" bob.

A kaolin product of high shape factor is considered to be more "platy" than a kaolin product of low shape factor. "Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078, which are incorporated herein by reference in their entirety, and using the equations derived in these patent specifications.

In the measurement method described in EP-A-0528078 the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements, the shape factor of the particulate material under test is determined.

In one aspect, the kaolin has a shape factor of at least about 30, such as a shape factor of at least about 40, or at least about 50. In another aspect, the kaolin has a shape factor ranging from about 20 to about 60, such as a shape factor ranging from about 30 to about 40, a shape factor ranging from about 40 to about 50, or a shape factor ranging from about 45 to 50.

In another aspect, the kaolin has a shape factor ranging from about 45 to about 50, at least about 96% by weight of the kaolin has an esd of less than about 2 μm, at least about 80% by weight of the kaolin has an esd of less than about 1 μm, and the amount of the kaolin having an esd of less than about 0.25 μm ranges from about 35% to about 45% by weight.

According to one aspect of the invention, the pigment product of the present invention comprises particles having a shape factor in the range of from about 20 to about 60.

Another aspect of the invention provides a method of refining kaolin comprising:
(a) providing a kaolin slurry comprising a sedimentary kaolin having a particle size distribution such that about 75% by weight of the kaolin has an esd of less than about 2 μm; and
(b) classifying said kaolin slurry to obtain kaolin having a shape factor of at least about 20, wherein at least about 94% by weight of the kaolin has an esd of less than about 2 μm.

In one aspect, the kaolin provided in step (a) has a shape factor of at least about 15, for example at least about 20, at least about 30 or even at least about 40. In another aspect, the kaolin provided in (a) has a particle size distribution wherein at least about 80% by weight of the kaolin has an esd of less than about 2 μm. In one aspect, the amount of the kaolin in the classified product having an esd of less than about 0.25 μm ranges from about 30% to about 60% by weight.

In one aspect, the sedimentary kaolin is a crude kaolin, such as Wrens crude, from Wrens, Ga., and in some aspects may be substantially stackless. It was an unexpected and surprising discovery that processing Wrens clay provided fine, platy kaolin that, when used as a pigment, possesses high-shear flowability and good brightness.

The slurry can be provided by blunging the crude or processed kaolin clay with water to form an aqueous suspension. The suspension can be a blended kaolin suspension.

In one aspect, the slurry can be subjected to wet media grinding, by using a particulate grinding medium, such as silica sand. The sand-grinding medium can have a relatively high specific gravity, for example 2 or more. The medium may for example comprise grains of silica sand having diameters not larger than about 2 μm and not smaller than about 0.25 μm. In one aspect, the slurry is subjected to an intense wet media grinding.

The classified kaolin from step (b) may optionally be subjected to a conventional leaching (or bleaching) known to one of ordinary skill in the art. For example, a reductive leaching agent such as sodium hydrosulfite may be added in a dose range of, for example, about 0.5 to 5.0 pounds per ton of kaolin, with certain embodiments containing less than about 4 pounds per ton on a dry basis. Other suitable reductive bleaching agents, such as formamidine sulphinic acid, may also be employed. Reductive bleaching using sodium hydrosulfite can be carried out at an acidic pH, typically in the range of 2.0 to 4.0.

The classifying (or fractionating) step (b) may be accomplished by using any known or after-discovered method. Exemplary methods include gravity sedimentation or elutriation, any type of hydrocyclone apparatus, or, for example, a solid bowl decanter centrifuge, disc nozzle centrifuge, or the like. The resultant coarse fraction may be discarded, used as a separate product or, for example, may be directed back to the blend tank as an auxiliary source for the coarse kaolin used in the method of the present invention.

In one aspect, the classifying step optionally comprises a defining step. "Defining" as used herein refers to removing a percentage of fines, i.e., fine particles, from the kaolin suspension. In one aspect, "fines" as used herein refers to particles having an esd of less than about 0.25 µm. Removal of the fines can be carried out on a centrifuge. For example, the kaolin suspension to be "defined" can be supplied to the centrifuge and separated into a coarse fraction and a fine fraction. A selected percentage by weight of the fine fraction is removed. The removed fraction can be reused for further processing.

In one aspect, the kaolin is defined to produce a product having a particle size distribution such that from about 10% to about 40% of the particles present have an esd of less than 0.25 µm, such as a level ranging from about 30% to about 40% finer than 0.25 µm. In another aspect, the kaolin is defined to about 40% finer than 0.25 µm.

In one aspect, the sedimentary kaolin, such as a substantially stackless sedimentary kaolin, may be derived by delaminating and defining a coarser kaolin.

In one aspect, the kaolin slurry provided (a) comprises at least about 80% by weight of the kaolin having an esd of less than about 2 µm, and a shape factor of at least about 10. This slurry can be subjected to a defining step to a level of about 40% by weight of the total amount of fines.

Optionally, the kaolin can be subjected to one or more well known beneficiation steps to remove undesirable impurities, e.g., prior to (b) or after classification. For example, the aqueous suspension of kaolin clay may be subjected to a froth flotation treatment operation to remove titanium-containing impurities in the froth. In a more specific example, the slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, which is herein incorporated by reference. This process can result in an improved brightness in the kaolin pigment, i.e., a brightness gain ranging from about 0.1 to about 3 units.

Alternatively, or in addition, the suspension may be passed through a high intensity magnetic separator to remove iron-containing impurities. A standard high intensity wet magnetic separator can be used. This process can also result in a brightness gain ranging from about 0.1 to about 3.0 units.

Also optionally, the slurry can be subjected to a selective flocculation process in which the impurities are flocced out of suspension while the kaolin clay remains in suspension. In one example, a high molecular weight anionic polymer having a molecular weight in excess of one million, or a molecular weight in the range of about 10 to about 15 million can be used. The anionic polymer can be a copolymer of a polyacrylamide or polyampholyte. The refined clay slurry may be ozoned, leached (bleached), and/or filtered, followed by either redispersing in a makedown tank or alternately spray dried. Details of a particular selective flocculation process can be found in U.S. Pat. No. 4,227,920, to Chapman and Anderson, and U.S. Pat. No. 5,685,900 to Yuan et al., which includes ozonation.

Selective separation methods can also be used as known in the art.

A gentle comminution step can be performed, such as grinding via a wet particulate grinding medium in order to break down composite particles or aggregates of individual particles. Such composite particles generally comprise coherent stacks or blocks of individual hexagonal plate-like particles, especially where the kaolin clay is from a sedimentary deposit. When the kaolin clay is subjected to relatively gentle comminution, e.g. a grinding step, many of the composite particles can be broken down to give the individual thin, substantially hexagonal plates, i.e., delamination, the result being an increase of the average shape factor of the kaolin clay. For example, this process may increase the shape factor of the kaolin clay from a starting shape factor of about 5 to 10 to an increased shape factor of at least about 50 to 55. The term "relatively gentle grinding" means, in accordance with the present disclosure, grinding in an attrition grinding mill with a particulate grinding medium, the contents of the attrition grinding mill being agitated by means of an impeller which rotates at a speed which is insufficient to set up a vortex in the suspension, such as at a peripheral speed below about $10 \text{ m.s}^{-1}$ and in which the amount of energy dissipated in the suspension during grinding ranges from 0 to about 200 kW-hr/ton, such as from 0 to about 35 kW-hr/ton, or from about 35 to about 200 kW-hr/ton, or such as less than about 75 kWh per dry ton, for example less than about 55 kWh per ton of kaolin clay on a dry weight basis. The particulate grinding medium can be of relatively high specific gravity, for example 2 or more, and may for example comprise grains of silica sand, the grains generally having diameters not larger than about 2 mm and not smaller than about 0.25 mm.

The kaolin suspension can be separated from the particulate grinding medium in any manner known in the art, such by passing the suspension through a sieve of appropriate aperture size, for example a sieve having nominal aperture sizes in the range of from about 0.1 mm to about 0.25 mm.

The classified kaolin suspension may be further treated to improve one or more of its properties. For example, high energy liquid working, e.g., using a high speed mixer, may be applied to the product in slurry form, and subsequent redispersion in an aqueous medium, e.g. during makedown of a coating composition.

In another aspect of the present invention, the classified kaolin can have a Hercules viscosity of less than about 4000 rpm at 18 dynes at 63% solids, less than about 2750 rpm at 18 dynes at 66% solids, or less than 1500 rpm at 18 dynes at 69% solids, all measured using the "A" bob.

In one aspect, the classified kaolin suspension may also optionally be dewatered in one of the ways well known in the art, e.g. filtration, centrifugation, evaporation and the like. Dewatering can be accomplished with a filter press. A resulting filter cake can be mixed subsequently with a dispersing agent for the kaolin clay and converted into a fluid slurry that can be transported and sold in this form. Alternatively, the kaolin clay may be thermally dried, for example by introducing the fluid slurry of the kaolin clay into a spray drier, such that it may be transported in a substantially dry form.

Another aspect of the present invention provides a method of refining kaolin, comprising:
(a) providing a kaolin slurry comprising a sedimentary kaolin having a shape factor of at least about 15, wherein at least about 80% by weight of the kaolin has an esd of less than about 2 µm;
(b) wet media grinding the degritted kaolin slurry consuming in the range of about 10 to about 200 kW-hr/ton of energy; and
(c) classifying the slurry to a fine fraction wherein at least about 96% to 98% of the kaolin by weight has an esd of less than about 2 µm.

Another aspect of the present invention provides another method of refining a slurry, comprising:

(a) providing a kaolin slurry, the kaolin having a shape factor of at least about 20, wherein at least about 70% by weight of the kaolin has an esd of less than about 2 µm; and (b) classifying the slurry to a fine fraction wherein at least about 96% to about 98% by weight of the kaolin has an esd of less than about 2 µm.

In one aspect, the kaolin in slurry (a) is a platy kaolin that is subjected to a classifying step.

In one aspect, the starting slurry can be prepared from Middle Georgia kaolin through a blunging/degritting process. The kaolin can be dried and re-slurried to a solids content ranging from about 35 to about 40%. The slurry to be treated in step (a) may optionally contain a dispersing agent for the kaolin. In another aspect, the kaolin provided in (a) can have a shape factor of at least about 30, or at least about 40, or at least about 50. In yet another aspect, the kaolin slurry provided in (a) has at least about 80% by weight of the kaolin having an esd of less than about 2 µm, or at least about 90% by weight of the kaolin having an esd of less than about 2 µm.

The method in this aspect of the invention can further comprise any of the refining steps discussed herein, or that are well known in the art.

The pigment product according to any aspect of the present invention may be used in paper coating as follows.

According to the present invention in another aspect there is provided a coating composition for use ein producing gloss coatings on paper and other substrates, which composition comprises an aqueous suspension of a particulate pigment and a hydrophilic adhesive or binder, wherein the particulate pigment comprises the pigment in accordance with any aspect of the invention. In this specification, the expression 'paper' embraces products such as paper, board, card and the like. Thus, one aspect of the present invention provides a coated paper, comprising a fibrous substrate, and a coating on the substrate comprising kaolin having a shape factor of at least about 20, wherein at least about 80% by weight of the kaolin has an esd of less than about 1 µm, and the amount of the kaolin having an esd of less than about 0.25 µm ranges from about –30% to about 60% by weight. In one aspect, the coating further comprises calcium carbonate. In another aspect, the coating comprises a kaolin having a particle size distribution such that at least 94% by weight of the kaolin particles have an esd of less than 2 microns. In yet another aspect, the coating comprises a kaolin having a Hercules viscosity of less than 4000 rpm at 18 dynes at 63% solids and less than 1500 rpm at 69% solids when measured using the "A" bob.

The solids content of the paper coating composition may be greater than about 50% by weight, such as a solids content of at least about 60% by weight, or even as high as possible but still giving a suitably fluid composition which may be used in coating. The composition may include a dispersing agent, e.g. up to 2% by weight of a polyelectrolyte based on the dry weight of pigment present, or any other dispersing agent known in the art, such as those described herein. The pigment product may be used as the sole pigment in a paper coating composition, or it may be used in conjunction with one or more other known pigments, such as for example, (commercially available) kaolin, calcined kaolin, natural or precipitated calcium carbonate, titanium dioxide, calcium sulphate, satin white, talc and so called 'plastic pigment'. In one aspect, when a mixture of pigments is used, the pigment product according to this aspect of the invention, is present in the mixture in an amount of at least about 20% of the total dry weight of the mixed pigments, such as amounts of at least about 30%, 50%, or even at least about 80% of the total dry weight of the mixed pigments.

The binder of the composition may comprise at least one adhesive derived from natural starch obtained from a known plant source, for example, wheat, corn, potato or tapioca, although it is not essential to use starch as a binder ingredient. Other binders, which may be used with or without starch, are mentioned later.

Where starch is employed as a binder ingredient, the starch may be unmodified or raw starch, or it may be modified by one or more chemical treatments known in the art. The starch may, for example, be oxidized to convert some of its —CH$_2$OH groups to —COOH groups. In some cases the starch may have a small proportion of acetyl-COCH$_3$, groups. Alternatively, the starch may be chemically treated to render it cationic or amphoteric, i.e., with both cationic and anionic charges. The starch may also be converted to a starch ether, or hydroxyalkylated starch by replacing some —OH groups with, for example, —O—CH$_2$—CH$_2$OH groups, —O—CH$_2$—CH$_3$ groups or —O—CH$_2$—CH$_2$—CH$_2$OH groups.

A further class of chemically treated starches which may be used are those known as the starch phosphates. Alternatively, the raw starch may be hydrolyzed by means of a dilute acid or an enzyme to produce a gum of the dextrin type. The amount of the starch binder used in any of the compositions described herein can range from about 2% to about 25% by weight, based on the dry weight of pigment. The starch binder may be used in conjunction with one or more other binders, for example synthetic binders of the latex or polyvinyl acetate or polyvinyl alcohol type.

When the starch binder is used in conjunction with another binder, e.g., a synthetic binder, the amount of the starch binder, in one aspect, ranges from about 2% to about 20% by weight. The synthetic binder can be present in an amount as high as 20%, for example, in applications such as board coating. In another aspect, the amount of the synthetic binder can range from about 2% to about 12% by weight, both based on the weight of dry pigment.

According to another aspect there is provided a method of use of the coating composition that comprises applying the composition to coat a sheet of paper and calendering the paper to form a gloss coating thereon. Thus, one aspect provides a method of making a coated paper, comprising coating a fibrous substrate with a paper coating composition comprising kaolin having a shape factor of at least about 20, wherein at least about 80% by weight of the kaolin has an esd of less than about 1 µm, and the amount of the kaolin having an esd of less than about 0.25 µm ranges from about 25% to about 60% by weight. In one aspect, the gloss coating is formed on both sides of the paper. In another aspect, the paper coating composition comprises a kaolin having a particle size distribution such that at least 94% of the kaolin particles have an esd less than about 2 microns. In yet another aspect, the coating comprises a kaolin having a Hercules viscosity of less than 4000 rpm at 18 dynes at 63% solids and less than 1500 rpm at 69% solids when measured using the "A" bob.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied. Five or more passes through the nips may be applied.

The paper, after coating and calendering in any of the methods described herein, may have a total weight per unit area ranging from about 30 g.m$^{-2}$ to about 300 g.m$^{-2}$. In another aspect the total weight per unit ranges from about 49 g.m$^{-2}$ to about 65 g.m$^2$ or from about 35 g.m$^{-2}$ to about 48 g.m$^{-2}$. The final coating may have a weight per unit area ranging from about 3 g.m$^{-2}$ to about 20 g.m$^{-2}$. The coated paper may be any kind of paper, such as lightweight coated (LWC), medium weight coated (MWC), e.g., with typical coatweights ranging from about 8 to about 15 g/m$^2$ per side (US #3 grades), or ultra lightweight coated (ULWC) paper, and paperboard or free sheet. The paper gloss may be greater than about 45 TAPPI units and the Parker Print Surf value at a pressure of 10 MPa of each paper coating may be less than about 1 μm.

The gloss of a coated paper surface may be measured by means of a test laid down in TAPPI Standard No 480 ts-65. The intensity of light reflected at an angle from the surface of the paper is measured and compared with a standard of known gloss value. The beams of incident and reflected light are both at an angle of 75° to the normal to the paper surface. The results are expressed in TAPPI gloss units. The gloss of the pigment product may be greater than about 50, in some cases greater than about 55, TAPPI units.

The Parker Print Surf test provides a measure of the smoothness of a paper surface, and comprises measuring the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean square gap in μm between the paper surface and the reference material is calculated. A smaller value of this gap represents a higher degree of smoothness of the surface of the paper under test.

An improvement is provided by the present invention where the binder present in the coating composition comprises starch. However, an improvement can also be obtained where other known starch-free binders are employed (with or without starch present). In each case the adhesive or binder may form from about 4% to about 30% by weight of the solids content of the composition.

In another aspect, the adhesive or binder may be present in an amount ranging from about 8% to about 20% by weight of the solids content of the composition. In yet another aspect, the adhesive or binder may be present in an amount ranging from about 8% to about 15% by weight of the solids content of the composition. The amount employed will depend upon the composition and the type of adhesive, which may itself incorporate one or more ingredients. For example, hydrophilic adhesives used in the art, e.g., incorporating one or more of the following adhesive or binder ingredients may be used in the following stated amounts:

(a) latex: levels range from about 4% by weight to about 20% by weight. The latex may comprise, for example, a styrene butadiene, acrylic latex, vinyl acetate latex, or styrene acrylic copolymers.

(b) other binders: levels range from, for example about 4% by weight to about 20% by weight. Examples of other binders include soy protein, casein, polyvinyl alcohol, polyvinyl acetate, and polyvinyl acetate acrylic copolymer.

At least one additive, such as those in various known classes may, depending upon the type of coating and the material to be coated, be included in the coating composition. Suitable non-limiting examples of such classes of optional additives include:

(a) crosslinkers: e.g., in levels of up to about 5% by weight; for example glyoxals, melamine formaldehyde resins, ammonium zirconium carbonates.

(b) water retention aids: e.g., in up to about 2% by weight, for example, sodium carboxymethyl cellulose, hydroxyethyl cellulose, PVA (polyvinyl acetate), starches, proteins, polyacrylates, gums, alginates, polyacrylamide bentonite and other commercially available products sold for such applications.

(c) viscosity modifiers o'r thickeners: e.g., in levels up to about 2% by weight; for example, polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.

(d) lubricity/calendering aids: e.g., in levels up to about 2% by weight, for example, calcium stearate, ammonium stearate, zinc stearate, wax emulsions, waxes, alkyl ketene dimer, glycols.

(e) dispersants: e.g., in levels up to about 2% by weight, for example, polyelectrolytes such as polyacrylates and copolymers containing polyacrylate species, such as polyacrylate salts (e.g., sodium and aluminum optionally with a group II metal salt), sodium hexametaphosphates, non-ionic polyol, polyphosphoric acid, condensed sodium phosphate, non-ionic surfactants, alkanolamine and other reagents commonly used for this function.

(f) antifoamers/defoamers: e.g., in levels up to about 1% by weight, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

(g) dry or wet pick improvement additives: e.g., in levels up to about 2% by weight, for example, melamine resin, polyethylene emulsions, urea formaldehyde, melamine formaldehyde, polyamide, calcium stearate, styrene maleic anhydride and others, (h) dry or wet rub improvement and abrasion resistance additives: e.g., in levels up to about 2% by weight, for example, glyoxal based resins, oxidized polyethylenes, melamine resins, urea formaldehyde, melamine formaldehyde, polyethylene wax, calcium stearate and others.

(i) gloss-ink hold-out additives: e.g., in levels up to about 2% by weight, for example, oxidized polyethylenes, polyethylene emulsions, waxes, casein, guar gum, CMC, HMC, calcium stearate, ammonium stearate, sodium alginate and others.

(j) optical brightening agents (OBA) and fluorescent whitening agents (FWA): e.g.; in levels up to about 2% by weight, for example stilbene derivatives.

(k) dyes: e.g., in levels, up to about 0.5% by weight.

(l) biocides/spoilage control agents: e.g. in levels up to 1% by weight, for example, metaborate, sodium dodecylbenene sulphonate, thiocyanate, organosulphur, sodium benzoate and other compounds sold commercially for this function.

(m) leveling and evening aids: e.g., in levels up to about 2% by weight, for example, non-ionic polyol, polyethylene emulsions, fatty acid, esters and alcohol derivatives, alcohol/ethylene oxide, sodium CMC, HEC, alginates, calcium stearate and other compounds sold commercially for this function.

(n) grease and oil resistance additives: e.g., in levels up to about 2% by weight, e.g., oxidized polyethylenes, latex, SMA (styrene maleic anhydride), polyamide, waxes, alginate, protein, CMC, HMC.

(o) water resistance additives: e.g., in levels up to about 2% by weight, e.g., oxidized polyethylenes, ketone resin, anionic latex, polyurethane, SMA, glyoxal, melamine resin, urea formaldehyde, melamine formaldehyde, polyamide, glyoxals, stearates and other materials commercially available for this function.

(p) insolubilizer: e.g., in levels up to about 2% by weight.

For all of the above additives, the percentages by weight quoted are based on the dry weight of pigment (100%) present in the composition. Where the additive is present in a minimum amount, the minimum amount may be 0.01% by weight based on the dry weight of pigment.

Any of the methods according to the present invention may be carried out in a known way which will depend upon the material to be coated, the coating composition to be applied and other factors as determined by the operator, e.g., speed and ease of runnability e.g., using a conventional coating machine.

Methods of coating paper and other sheet materials are widely published and well known. For example, there is a review of such methods published in Pulp and Paper International, May 1994, page 18 et seq. Sheets may be coated on the sheet forming machine, i.e., "on-machine", or "off-machine" on a coater or coating machine. Use of high solids compositions is desirable in the coating method because it leaves less water to evaporate subsequently. However, as is well known in the art, the solids level should not be so high that high viscosity and leveling problems are introduced.

Methods of coating may involve (i) a means of applying the coating composition to the material to be coated, viz., an applicator; and (ii) a means for ensuring that a correct level of coating composition is applied, viz., a metering device. When an excess of coating composition is applied to the applicator, the metering device is downstream of it.

Alternatively, the correct amount of coating composition may be applied to the applicator by the metering device, e.g., as a film press. At the points of coating application and metering, the paper web support ranges from a backing roll, e.g., via one or two applicators, to nothing i.e., just tension. The time the coating is in contact with the paper before the excess is finally removed is the dwell time—and this may be short, long or variable.

The coating is usually added by a coating head at a coating station. According to the quality, desired, paper grades are uncoated, single coated, double coated and even triple coated. When providing more than one coat, the initial coat (precoat) may have a cheaper formulation and optionally less pigment in the coating composition. A coater that is applying a double coating, i.e.; a coating on each side of the paper, will have two or four coating heads, depending on the number of sides coated by each head. Most coating heads coat only one side at a time, but some roll coaters (e.g., film press, gate roll, size press) coat both sides in one pass.

Examples of known coaters which may be employed include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters and extrusion coaters.

In the case of coating compositions, water may be added to the solids to give a concentration of solids which, when coated onto a sheet to a desired target coat weight, has a rheology suitable for the composition, to be coated with a pressure (e.g., a blade pressure) of between about 1 and about 1.5 bar. Generally, the solids content may be at least about 50% by weight, such as at least about 60% or a solids content ranging from about 50% to about 60% by weight.

Another aspect of the present invention provides a method for increasing the population of kaolin clay particles having a high shape factor. Certain processes may disadvantageously result in a reduction in shape factor value. For example, it is sometimes desirable to dewater a slurry by completely drying down a portion of the slurry by a conventional drying process (such as by spray drying), and then recombining the dried portion of the slurry with the remainder to effectively raise the solids context of the whole. Spray driers can potentially cause aggregation of the kaolin particles, which reduces the shape factor. Further, the recombined slurry is typically made down using a Cowles dissolver or similar high shear mixer that can also cause a reduction in shape factor. Without being bound by any theory, shearing forces arising from the mixing may cause fine particles to be broken off from the edge of the clay. The production of these fines can cause a reduction in shape factor value by as much as six units. The use of an additional 2 lbs C-211 dispersant into the feed of the Cowles dissolver may not alleviate the loss in shape factor or an increase in fines.

In one aspect, the invention provides the use of an evaporator system, such as an open-end system, which can reduce a loss in shape factor value. An evaporator can result in less work input. By putting less work into the clay during makedown, the loss in shape factor can be reduced or, in some instances, eliminated.

Thus, the method for making a kaolin slurry comprises preparing a clay slurry by adding water and at least one dispersant to dry clay. The slurry is dewatered in an evaporator system, i.e., as feed enters, product exits. In one aspect, the slurry comprises kaolin having a shape factor of at least about 50, and a particle size distribution, wherein less than about 85% by weight has an esd of less than about 2 µm. In another aspect, the kaolin has a shape factor of at least about 25, and at least about 85% by weight of the kaolin has an esd less than about 2 µm.

The invention will be further clarified by the following non-limiting examples, which are intended to be purely exemplary of the invention.

EXAMPLE 1

A kaolin composition according to the invention was prepared from Middle Georgia Kaolin crude. The crude was blunged and degritted. The resulting slurry was subjected to selective flocculation followed by magnetic separation. After sand grinding, the slurry was classified to 98%<2 µm. The product can be used as a slurry or as dried, such as by spray drying. Product specifications for the spray-dried "Inventive Kaolin A" are provided in Table I.

TABLE 1

|  | Inventive Kaolin A |
| --- | --- |
| % solids | 98.8% |
| GE Brightness | 87.88 |
| L | 95.96 |
| a | −0.27 |
| b | 3.62 |
| $TiO_2$ (wt. %) | 1.366 |
| $Fe_2O_3$ (wt. %) | 0.515 |
| Brookfield, cps #1 spindle @20 rpm | 660 |
| Hercules rpm @ 18 dynes | 1160 |

TABLE 1-continued

|  | Inventive Kaolin A |
|---|---|
| % solids for viscosity | 63 |
| Shape Factor | 48.5 |
| PSD <2 μm | 96.8 |
| <1 μm | 87.4 |
| <.5 μm | 71.1 |
| <.25 μm | 42.6 |

EXAMPLE 2

Pigments were prepared with Inventive Kaolin A from Example 1 and compared with those prepared from prior art kaolins Hydragloss® (J. M. Huber, Macon, Ga.), AstraSheen® (Imerys), and Contour 1270® (Imerys). The physical properties of the prior art kaolins are provided in Table 2.

TABLE 2

|  | HYDRAGLOSS | AstraSheen | Contour 1270 |
|---|---|---|---|
| Brightness, GE | 87.7 | 91.1 | 88.0 |
| B value | 3.72 | 1.86 | 3.2 |
| % <2 μm | 98 | 99 | 91 |
| % <0.25 μm | 61 | 67 | 27 |
| Shape factor | low | low- | 42 |
| Hercules Dynes@4400 | 8 | 4.9 |  |

Paper was coated with a jet coater at 1400 m/min, 11.8 gsm on both sides of the paper with 4.5% moisture. The coating was supercalendered under constant conditions to a target 70 gloss. The coating formulations are provided in Table 3 as % by weight.

TABLE 3

| Hydragloss | 49 |  |  |  |
|---|---|---|---|---|
| AstraSheen |  | 49 |  |  |
| Inventive Kaolin A |  |  | 49 |  |
| C1270 |  |  |  | 49 |
| Carbital 95 (ground calcium carbonate) | 49 | 49 | 49 | 49 |
| TiO2 | 2 | 2 | 2 | 2 |
| Latex (styrene/butadiene binder) | 9 | 9 | 9 |  |
| PG 280 (starch binder) | 8 | 8 | 8 |  |
| Calcium Stearate | 0.35 | 0.35 | 0.35 | 0.35 |
| Berset 2720 (ammonium zirconium carbonate insolubilizer) | 0.25 | 0.25 | 0.25 | 0.25 |
| Ciba N40 (Dispex dispersant) |  | 0.1 | 0.1 | 0.1 |

The coating rheology is provided in Table 4.

TABLE 4

|  | Hydragloss | AstraSheen | Inventive Kaolin A | C 1270 |
|---|---|---|---|---|
| % Solids on Coater | 61.8 | 61.2 | 59.8 | 59.7 |
| pH | 8.65 | 8.65 | 8.21 | 8.54 |
| Temperature ° C. | 29.8 | 31.1 | 32.4 | 28.0 |
| Brookfield Viscosity (No. 5 spindle) |  |  |  |  |
| 10 rpm | 19000 | 16840 | 14600 | 10560 |
| 20 rpm | 11560 | 10400 | 9320 | 6760 |

TABLE 4-continued

|  | Hydragloss | AstraSheen | Inventive Kaolin A | C 1270 |
|---|---|---|---|---|
| 50 rpm | 5872 | 5320 | 4920 | 3632 |
| 100 rpm | 3540 | 3192 | 3044 | 2280 |
| Hercules Viscosity |  |  |  |  |
| Deflection at peak rpm | 14.82 | 14.01 | 16.88 | 13.72 |
| Apparent Viscosity | 102.9 | 97.3 | 117.2 | 95.3 |
| Water Retention (g/m$^2$) | 51 | 82 | 46 | 49 |

The coating speed was 1400 (m/min.). Moisture at the first pass was 3.5 and at the second pass, 4.5. The gloss target was 75. The paper was coated on both sides to a level of 11.8 gsm each side.

The sheet properties are shown in Table 5.

TABLE 5

|  | Hydragloss | AstraSheen | Inventive Kaolin A | C 1270 |
|---|---|---|---|---|
| Brightness - ISO | 77.0 | 78.8 | 78.7 | 79.7 |
| Hunter b - ISO | 3.00 | 1.89 | 2.50 | 2.37 |
| Opacity - Printers | 88.3 | 87.8 | 89.5 | 89.8 |
| Sheet Gloss (75) | 73.0 | 73.9 | 71.3 | 67.0 |
| Print Gloss (75) | 80.3 | 80.8 | 84.9 | 84.8 |
| Delta Print Gloss (75) | 7.3 | 6.9 | 13.6 | 17.8 |
| Print Gloss (20) | 21.9 | 22.1 | 25.1 | 23.9 |
| PPS S10 Roughness (μm) | 1.09 | 1.09 | 1.01 | 1.02 |

Inventive Kaolin A provides the best overall performance. It is surprisingly bright and comparable to Astrasheen, most likely due to the higher shape factor. The opacity is also high, most likely again due to the higher shape factor. The higher sheet gloss value over Contour 1270 may be attributed to the fineness of Inventive Kaolin A. The print gloss and delta gloss values are also high for Inventive Kaolin A.

EXAMPLE 3

The pigment and coating properties of Inventive Kaolin A were monitored with the addition of other compositions, such as Carbital 95 and Alphalux 91. The pigment properties and coating formulations and rheology are listed in Tables 6 and 7, respectively.

TABLE 6

| Pigment Properties | Carbital 95 | Inventive Kaolin A | Hydragloss | Alphalux 91 |
|---|---|---|---|---|
| GE Brightness | 96.7 | 88.5 | 87.7 | 91.3 |
| b Value | 0.6 | 3.1 | 3.7 | 1.9 |
| PSD % <2 μm | 93 | 96 | 98 | 99 |
| PSD % <.25 μm | 23 | 39 | 61 | 65 |
| Steepness | 31.9 | 35.8 | 37.7 | 36.9 |
| Visc. Brook #2@20 As is | 226 | 246 | 340 | 295 |
| Visc. Herc rpm@18 dynes | 2640 | 1020 | * | * |
| Visc: Solids % | 76.2 | 63.0 | 70.0 | 70.0 |
| Shape factor | * | 52 | 11 | * |

TABLE 7

| Coating Formulations and Rheology | | | | | | |
|---|---|---|---|---|---|---|
| Carbital 95 | 31.6 | 31.6 | 31.6 | 31.6 | 31.6 | 31.6 |
| Hydragloss | 66.1 | | | | | |
| Inventive Kaolin A | | 68.4 | 54.7 | 47.9 | 52.9 | 46.3 |
| Alphalux 91 | | | 13.7 | 20.5 | 13.2 | 19.8 |
| TiO2 | 2.3 | | | | 2.3 | 2.3 |
| N-40 | 0.1 | 0.1 | 0.1 | 0.1 | 0.1 | 0.1 |
| PG-280 | 8.2 | 8.2 | 8.2 | 8.2 | 8.2 | 8.2 |
| C-104 | 0.35 | 0.35 | 0.35 | 0.35 | 0.35 | 0.35 |
| Sunrez 700M | 0.25 | 0.25 | 0.25 | 0.25 | 0.25 | 0.25 |
| Dow 620 | 9.4 | 9.4 | 9.4 | 9.4 | 9.4 | 9.4 |
| Brookfield Viscosity: spindle 5 | | | | | | |
| cps @ 10 rpm | 14320 | 6520 | 10776 | 12160 | 10880 | 11120 |
| cps @ 20 rpm | 8180 | 3920 | 6340 | 7140 | 6260 | 6320 |
| cps @ 50 rpm | 4120 | 2056 | 3296 | 3680 | 3120 | 3248 |
| cps @ 100 rpm | 2480 | 1316 | 2016 | 2196 | 1956 | 2012 |
| Hercules Viscosity @ 4400 rpm: | | | | | | |
| Dynes | 50.0 | 49.0 | 54.6 | 61.1 | 56.7 | 52.4 |
| Apparent Viscosity (cP): | 86.8 | 85.0 | 94.8 | 106.0 | 98.5 | 91 |
| Rheogram Hysteresis Area: cm2 | 60.8 | 89.1 | 107.8 | 96.7 | 109.3 | 77.4 |
| % Solids | 63.3 | 59 | 60.7 | 62 | 60.8 | 61.4 |

The formulations were coated on the sheet according to the conditions listed in Table 8.

TABLE 8

| Sheet Properties Interpolated to 70 Sheet Gloss | 66.1 (% by wt.) Hydragloss 31.6 Carbital 95 2.3 TiO2 | 68.4 Inventive Kaolin A 31.6 Carbital 95 | 54.7 Inventive Kaolin A 31.6 Carbital 95 13.7 Alphalux 91 | 47.9 Inventive Kaolin A 31.6 Carbital 95 20.5 Alphalux 91 | 52.9 Inventive Kaolin A 31.6 Carbital 95 13.2 Alphalux 91 2.3 TiO2 | 46.3 Inventive Kaolin A 31.6 Carbital 95 19.8 Alphalux 91 2.3 TiO2 |
|---|---|---|---|---|---|---|
| Calender Pressure (psi) | 253.8 | 283.7 | 281.1 | 274.5 | 296.3 | 284.5 |
| Brightness - ISO | 79.8 | 80.7 | 80.5 | 80.6 | 81.0 | 81.1 |
| Opacity - Printers | 86.6 | 86.4 | 86.2 | 86.1 | 86.4 | 86.3 |
| Sheet Gloss (75) | 70.0 | 70.0 | 70.0 | 70.0 | 70.0 | 70.0 |
| Print Gloss | 90.1 | 95.7 | 96.0 | 94.2 | 94.4 | 91.5 |
| Delta Gloss | 20.1 | 25.7 | 26.0 | 24.2 | 24.4 | 21.5 |

The data above shows that the formulations containing the Inventive Kaolin A composition; provides a comparable or better performance in all aspects compared to the Hydragloss composition, particularly with respect to brightness, print gloss, and delta gloss.

EXAMPLE

This example describes the preparation of an inventive kaolin product via a defining step. A kaolin crude slurry containing at least 80% by weight of the kaolin having an esd of less than about 2 μm, and a shape factor of at least about 15 was subjected to light sand grinding. The kaolin was defined to a level of 40%<0.25 μm by weight. The physical properties of the resulting product, Inventive Kaolin B, are compared with that of Hydragloss® in Table 9.

TABLE 9

| | Sample | |
|---|---|---|
| Pigment Properties | Hydragloss | Inventive Kaolin B |
| Brightness GE | 87.7 | 88.6 |
| b Value | 3.7 | 3.5 |
| Shape Factor | 11 | 49 |
| PSD % <2 μm | 98 | 98 |
| PSD % <0.25 μm | 61 | 38 |
| Brookfield @ 20 rpm | 320 | 188 |
| Hercules dynes @ 4400 rpm | 8.0 | * |
| Hercules rpm @ 18 dynes | * | 430 |
| Viscosity Solids (%) | 70.0 | 66.0 |

Formulations with Carbital 95 (ground calcium carbonate) were prepared and the wt % of the ingredients are shown in the Table 10 below. These formulations were coated onto a sheet and the resulting properties are also tabulated in Table 11.

TABLE 10

| | | | |
|---|---|---|---|
| Carbital 95 | 50 | 50 | |
| Hydragloss | 50 | | |
| Inventive Kaolin B | | 50 | |
| Dispex | 0.15 | 0.15 | Dispersant |
| PG 280 | 4 | 4 | Starch |
| C104 | 0.4 | 0.4 | Stearate |
| SUN720WG | 0.4 | 0.4 | Insolubilizer |
| Dow 620 | 12 | 12 | Latex |
| Sterecol FD | 0.15 | 0.15 | Thickener |

TABLE 11

| | Sample | |
|---|---|---|
| Sheet Properties | Hydragloss | Inventive Kaolin B |
| ISO Brightness | 79.4 | 81.4 |
| Printer's Opacity | 83.9 | 84.9 |
| Sheet Gloss (75) | 75.9 | 73.7 |
| Print Gloss (75) | 89.4 | 94.5 |
| Delta Gloss | 13.6 | 20.7 |

The Inventive Kaolin B formulations provide superior overall results compared to the Hydragloss formulation, particularly with respect to brightness, opacity, print gloss, and delta gloss properties.

EXAMPLE 5

This example describes the preparation of an inventive kaolin product from a kaolin crude sample containing at least 80% by weight of the kaolin having an esd of less than about 2 μm, and a shape factor of at least about 15. The crude was blunged with 6 lbs/ton of Calgone dispersant and 3 lbs/ton C-211 dispersant. After magnetic separation, the slurry was subjected to a light sand-grinding step for approximately 10-min. After classifying the slurry to 98%<2 μm, the fine fraction was leached, filtered and dried. The properties of the fine fraction are shown in Table 12.

TABLE 12

| | |
|---|---|
| Recovery | 73% |
| Brightness | 89.6 |
| Shape Factor | 41 |
| % <2 μm | 98.9 |
| % <0.25 μm | 59.4 |
| Brkfield, #2 spindle @20 rpm | 380 cps |
| Hercules, @18 dynes | 4080 rpm |
| % Solids* | 67% |

EXAMPLE 6

This example illustrates the preparation of another inventive composition starting with a platy kaolin. The platy kaolin was slurried to a 40% solution and classified to 98%<2 μm. The properties of the starting platy kaolin and the spray-dried product are shown in Table 13.

TABLE 13

| | Starting Kaolin | Spray dried inventive kaolin |
|---|---|---|
| Recovery | | 68% |
| Brightness | 87.85 | 88 |
| Shape Factor | 54.6 | 42 |
| % <2 μm | 90.5 | 96 |
| % <0.25 μm | 29.5 | 40 |
| Brkfield, cps | 790 cps (#1 spindle @20 rpm) | 895 cps (#2 spindle @20 rpm) |
| Hercules, rpm @ 18 dynes | 590 rpm | 720 rpm |
| % solids | 99.0% | 65% |

The properties of the inventive kaolins of Examples 5 and 6 are shown in the following Table 14, featuring the optimal viscosity properties.

TABLE 14

| | Starting Kaolin | Spray dried inventive kaolin |
|---|---|---|
| Recovery | 73% | 68% |
| Brightness | 89.6 | 88 |
| Shape Factor | 41 | 42 |
| % <2 μm | 98.9 | 96 |
| % <0.25 μm | 59.4 | 40 |
| Brkfield, cps | 380 cps (#2 spindle @ 20 rpm) | 895 cps (#2 spindle @ 20 rpm) |
| Hercules, rpm @ 18 dynes | 4080 rpm | 720 rpm |
| % solids | 67% | 65% |

EXAMPLE 7

Other inventive kaolin compositions are tabulated in Table 15, compared to Hydragloss®.

TABLE 15

| Product # | Inventive Kaolin A | Inventive Kaolin C | Inventive Kaolin D | Hydragloss |
|---|---|---|---|---|
| Brightness | 87.88 | 88.69 | 87.23 | 87.7 |
| L | 95.96 | 96.1 | 95.86 | 95.93 |
| a | −0.27 | −0.19 | −0.25 | −0.4 |
| b | 3.62 | 3.17 | 3.94 | 3.72 |
| $TiO_2$ (wt. %) | 1.366 | 1.213 | 1.504 | 1.350 |
| $Fe_2O_3$ (wt. %) | 0.515 | 0.661 | 0.59 | 0.860 |
| Brookfield (cps) #1 @ 20 rpm | 660 | 590 | 890 | 320 |
| Hercules (rpm @ 18 dyne) | 1160 | 2600 | 920 | 8 (dynes @ 4400 rpm) |
| % solids for viscosity | 63 | 63 | 63 | 70 |
| Shape Factor | 55.5 | 35.7 | 45.4 | 11.0 |
| PSD: | | | | |
| 2 μm | 96.3 | 98.1 | 97.0 | 98 |
| .25 μm | 38.4 | 40.8 | 41.4 | 61 |
| BET Surface Area ($m_2$/g) | 21.0 | 20.7 | 20.1 | 22.9 |

Formulations of the kaolins were prepared and the ingredients are presented as wt % in the following Table 16. The formulations then were coated onto paper, and their properties tabulated below in Table 17.

TABLE 16

| Carbital 95 | 50 | 50 | 50 | 50 |
|---|---|---|---|---|
| Hydragloss | 50 | | | |
| Inventive Kaolin A | | 50 | | |
| Inventive Kaolin C | | | 50 | |
| Inventive Kaolin D | | | | 50 |
| Dispex | 0.15 | 0.15 | 0.15 | 0.15 |
| PG 280 | 4 | 4 | 4 | 4 |
| C104 | 0.4 | 0.4 | 0.4 | 0.4 |
| SUN720WG | 0.4 | 0.4 | 0.4 | 0.4 |
| Dow 620 | 12 | 12 | 12 | 12 |
| Sterecol FD | 0.15 | 0.15 | 0.15 | 0.15 |

TABLE 17

| | Hydragloss | Inventive Kaolin A | Inventive Kaolin C | Inventive Kaolin D |
|---|---|---|---|---|
| 70 Gloss, 1.3 Print Density | | | | |
| Calender Pressure (psi) | 298.0 | 343.2 | 355.1 | 317.1 |
| Brightness - ISO | 79.6 | 80.5 | 80.1 | 80.8 |
| Hunter b - ISO | 3.3 | 3.0 | 3.2 | 2.8 |
| Opacity - Printers | 84.2 | 84.8 | 84.5 | 84.7 |
| Print Gloss (75), 1.3 | 71.4 | 74.1 | 73.8 | 74.2 |
| Delta Gloss | 1.4 | 4.1 | 3.8 | 4.2 |
| PPS S10 Roughness (μm) | 1.0 | 0.9 | 0.9 | 0.9 |

It can be seen that the Inventive Kaolins outperform the Hydragloss®-based coating, particularly in terms of the delta gloss values.

EXAMPLE 8

In this example, the loss in shape factor during slurry makedown is analyzed when the process occurs in a dewatering process by using a spray dryer to completely dry down a portion of the slurry and then recombining the dried portion of the slurry with the remainder in a Cowles Dissolver to effectively raise the solids context of the whole, versus using an evaporator to dry down the slurry.

This example shows that the platyness of the product of invention may be affected by the pre-shipment slurry make down process. As is well known in the industry, kaolin products may be shipped in dry form or in high solids slurry form. When shipped in slurry form, the final slurry may be made down in a Cowles dissolver or similar mixing device from a mixture of spay dried product and low solids slip. The dried portion is then remixed with the slurry to obtain a dewatered product. Alternatively, the final slurry may be made by raising the solids concentration of the low solid slip through an evaporator.

The following Table 18 shows that the evaporator method causes significantly less reduction of shape factor in the product and therefore is more advantageous for maintaining the high shape factor of the product of the invention.

TABLE 18

| | Shape Factor | Solids content (%) | % <2 μm | % <0.1 μm |
|---|---|---|---|---|
| Feed material | 53.5 | 50.6 | 89.3 | 12.6 |
| Cowles dissolver | 49.3 | 65.3 | 88.3 | 14.5 |
| Evaporator | 52.7 | 64.8 | 88.7 | 13.9 |

Without wishing to be bound by any theory, mixers such as the Cowles dissolver could cause the edges of clay platelets to break off and thereby create relatively less platy and ultra-fine particles. This may cause the larger increase in the amount particles <1 μm in the product slurry made down through Cowles Dissolver. In contrast, the evaporator did not change the shape factor of the feed material significantly. The % fines <1 μm did not increase as much in the evaporator as for the Cowles dissolver.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other aspects of the invention will be apparent to those skilled in the art from consideration of the specification. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising kaolin having a shape factor ranging from 32 to 49, wherein at least about 85% by weight of the kaolin has an esd of less than about 1 μm, the amount of the kaolin having an esd of less than about 0.25 μm ranges from 35% to about 60% by weight.

2. The composition according to claim 1, wherein the kaolin has a Hercules viscosity of less than about 4000 rpm at 18 dynes at 63% solids when measured using the "A" bob.

3. The composition according to claim 1, wherein at least about 94% by weight of the kaolin has an esd of less than about 2 μm.

4. The composition according to claim 1, wherein at least about 95% by weight of the kaolin has an esd of less than about 2 μm.

5. The composition according to claim 1, wherein at least about 96% by weight of the kaolin has an esd of less than about 2 μm.

6. The composition according to claim 1, wherein at least about 98% by weight of the kaolin has an esd of less than about 2 μm.

7. The composition according to claim 1, wherein the amount of the kaolin having an esd of less than about 2 μm ranges from about 94% to about 99% by weight.

8. The composition according to claim 1, wherein at least about 88% by weight of the kaolin has an esd of less than about 1 μm.

9. The composition according to claim 1, wherein at least about 92% by weight of the kaolin has an esd of less than about 1 μm.

10. The composition according to claim 1, wherein the kaolin has a shape factor ranging from 35 to 49.

11. The composition according to claim 1, wherein the kaolin has a shape factor ranging from 40 to 49.

12. The composition according to claim 1, wherein the kaolin has a shape factor ranging from about 35 to about 40.

13. The composition according to claim 1, wherein the amount of the kaolin having an esd of less than about 0.25 μm ranges from 35% to about 50% by weight.

14. The composition according to claim 1, wherein the kaolin has a shape factor ranging from 45 to 49, at least about 96% by weight of the kaolin has an esd of less than about 2 µm, at least about 85% by weight of the kaolin has an esd of less than about 1 µm, and the amount of the kaolin having an esd of less than 0.25 µm ranges from 35% to about 45% by weight.

15. A method of refining kaolin, comprising:
(a) providing a degritted kaolin slurry having a shape factor of at least about 10 and including at least about 80% by weight particles having an esd of less than about 2 µm;
(b) wet media grinding the degritted kaolin slurry consuming in the range of from about 10 to about 200 Kw-hr/ton of energy; and
(c) classifying the slurry to a fine fraction wherein from about 96% to about 98% by weight of the classified kaolin has an esd of about 2 µm and the classified kaolin has a shape factor of less than or equal to 49.

16. The method according to claim 15, wherein the degritted kaolin slurry provided in (a) has a shape factor of at least about 20.

17. The method according to claim 15, wherein the degritted kaolin slurry provided in (a) has a shape factor of at least about 30.

18. The method according to claim 15, wherein the degritted kaolin slurry provided in (a) has a shape factor of at least about 40.

19. The method according to claim 15, wherein the amount of the kaolin in part (c) having an esd of less than about 0.25 µm ranges from about 25% to about 60% by weight.

20. The method according to claim 15, further comprising spray-drying the fine fraction.

21. The method according to claim 15, wherein the kaolin slurry is subjected to a beneficiation step selected from: selective flocculation, ozone treatment, flotation, magnetic separation, leaching, or any combination thereof.

22. The method according to claim 15, further comprising leaching the kaolin fine fraction and filtering and drying the leached kaolin fine fraction.

23. A coated paper comprising:
a fibrous substrate; and
a coating on the substrate comprising kaolin having a shape factor of at least 32, wherein at least about 85% by weight of the kaolin has an esd of less than about 1 µm, the amount of the kaolin having an esd of less than about 0.25 µm ranges from about 25% to about 60% by weight.

24. The paper according to claim 23, wherein at least about 94% by weight of the kaolin has an esd of less than about 2 µm.

25. The paper according to claim 23, wherein the kaolin has a Hercules viscosity of less than 4000 rpm at 18 dynes at 63% solids when measured using the "A" bob.

26. The paper according to claim 23, wherein the coating further comprises calcium carbonate.

27. A method of making a coated paper comprising:
coating a fibrous substrate with a paper coating composition comprising kaolin having a shape factor of at least 32, at least 85% by weight of the kaolin has an esd of less than 1 µm, the amount of the kaolin having an esd of less than about 0.25 µm ranges from about 25% to about 60% by weight.

28. The method of claim 27, wherein at least about 94% by weight of the kaolin has an esd of less than about 2 µm.

29. The method of claim 27, wherein the kaolin has a Hercules viscosity of less than 4000 rpm at 18 dynes at 63% solids when measured using the "A" bob.

30. A coated paper comprising:
a fibrous substrate; and
a coating on the substrate comprising kaolin having a shape factor of at least 32, at least about 85% by weight of the kaolin having an esd of less than about 1 µm and the amount of the kaolin having an esd of less than about 0.25 µm ranges from about 25% to about 60% by weight, wherein gloss of the coated paper is greater than about 45 TAPPI units.

* * * * *